US012716371B2

(12) United States Patent
Deng

(10) Patent No.: US 12,716,371 B2
(45) Date of Patent: Aug. 25, 2026

(54) H2 POWER PLANT WITH O2 INTEGRATION

(71) Applicant: Mitsubishi Power Americas, Inc., Lake Mary, FL (US)

(72) Inventor: Shimin Deng, Oakville (CA)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 18/286,409

(22) PCT Filed: Jan. 19, 2022

(86) PCT No.: PCT/US2022/012928
§ 371 (c)(1),
(2) Date: Oct. 11, 2023

(87) PCT Pub. No.: WO2023/027762
PCT Pub. Date: Mar. 2, 2023

(65) Prior Publication Data

US 2024/0183289 A1 Jun. 6, 2024

Related U.S. Application Data

(60) Provisional application No. 63/236,898, filed on Aug. 25, 2021.

(51) Int. Cl.
*F01K 23/10* (2006.01)
*F01K 13/02* (2006.01)
(Continued)

(52) U.S. Cl.
CPC ............ *F01K 23/101* (2013.01); *F01K 13/02* (2013.01); *F02C 6/18* (2013.01); *F02C 7/224* (2013.01);
(Continued)

(58) Field of Classification Search
CPC ........ F01K 23/10; F01K 23/101; F01K 13/02; F02C 6/18; F02C 7/224; F02C 7/18; F02C 9/18
See application file for complete search history.

(56) References Cited

U.S. PATENT DOCUMENTS 4,047,005 A * 9/1977 Heiser .................. F01K 23/108 290/40 R
5,794,448 A 8/1998 Fujioka et al.
(Continued)

FOREIGN PATENT DOCUMENTS

| | | | | |
|---|---|---|---|---|
| JP | 2870232 | * | 7/1991 | |
| WO | WO-2020005220 A1 | * | 1/2020 | ............. F01K 23/10 |
| WO | 2023027762 | | 3/2023 | |

OTHER PUBLICATIONS

Wikipedia, "High-pressure electrolysis", [Online]. Retrieved from the Internet: < High-pressure electrolysis—Wikipedia>, (Accessed online Feb. 12, 2025, archive dated Nov. 12, 2020), 3 pages. (Year: 2020).*

(Continued)

*Primary Examiner* — Phutthiwat Wongwian
*Assistant Examiner* — Roberto Toshiharu Igue
(74) *Attorney, Agent, or Firm* — Schwegman Lundberg & Woessner, P.A.

(57) ABSTRACT

A power production facility comprises a combined cycle power plant comprising a gas turbine engine configured to compress air for combustion with a fuel in a combustor to produce exhaust gas that can be used to produce rotational shaft power for generating electricity and a steam system configured to produce steam from water with the exhaust gas to rotate a steam turbine for generating additional electricity, an electrolyzer configured to generate H2 and O2, wherein the electrolyzer is configured to provide the H2 to the combustor for combustion and the O2 to portions of the gas
(Continued)

turbine engine, and a heat exchanger configured to receive the O2 and fluid from the steam system and to heat the O2 before passing the O2 into portions of the gas turbine engine.

20 Claims, 7 Drawing Sheets

(51) Int. Cl.
*F02C 6/18* (2006.01)
*F02C 7/224* (2006.01)

(52) U.S. Cl.
CPC ...... *F05D 2210/12* (2013.01); *F05D 2220/72* (2013.01); *F05D 2260/606* (2013.01)

(56) References Cited

U.S. PATENT DOCUMENTS

| | | | | |
|---|---|---|---|---|
| 10,352,249 | B2 | 7/2019 | Yamazaki et al. | |
| 2012/0102962 | A1 | 5/2012 | Sivasankaran et al. | |
| 2013/0160424 | A1* | 6/2013 | Broesamle | F01K 23/02 60/39.182 |
| 2015/0361833 | A1 | 12/2015 | Hinders et al. | |
| 2016/0341126 | A1* | 11/2016 | Kupratis | F02C 9/18 |
| 2019/0264582 | A1* | 8/2019 | Hinders | F01K 23/10 |
| 2021/0239015 | A1 | 8/2021 | Brooker et al. | |
| 2021/0254547 | A1 | 8/2021 | Deng | |
| 2022/0065162 | A1 | 3/2022 | Hunt et al. | |
| 2022/0252011 | A1* | 8/2022 | Rambo | F02C 7/224 |
| 2022/0412668 | A1* | 12/2022 | Strange | B23P 15/26 |
| 2024/0055943 | A1* | 2/2024 | Giancotti | F02C 3/20 |

OTHER PUBLICATIONS

"International Application Serial No. PCT/US2022/012928, International Preliminary Report on Patentability mailed Mar. 7, 2024", 8 pgs.

Department of Energy, "Hydrogen Production: Electrolysis", [Online]. Retrieved from the Internet: <https://www.energy.gov/eere/fuelcells/hydrogen-production-electrolysis>, (Accessed online Dec. 12, 2024), 7 pages.

Dotan, Hen, et al., "Decoupled hydrogen and oxygen evolution by a two-step electrochemical—chemical cycle for efficient overall water splitting", Nature Energy vol. 4, (Sep. 13, 2019), 10 pages.

Goldmeer, Dr. Jeffrey, "Power to Gas: Hydrogen for Power Generation", GEA33861, [Online]. Retrieved from the Internet: <chrome-extension://efaidnbmnnnibpcajpcglclefindmkaj/https://www.gevernova.com/content/dam/gepower/global/en_US/documents/fuel-flexibility/GEA33861-Power-to-Gas-Hydrogen-for-Power-Generation.pdf>, (Feb. 2019), 19 pages.

Wikipedia, "High-pressure electrolysis", [Online]. Retrieved from the Internet: <https://en.wikipedia.org/wiki/High-pressure_electrolysis>, (Accessed online Dec. 12, 2024), 3 pages.

"International Application Serial No. PCT US2022 012928, Invitation to Pay Additional Fees mailed Mar. 31, 2022", 3 pgs.

"International Application Serial No. PCT US2022 012928, International Search Report mailed Jun. 14, 2022", 4 pgs.

"International Application Serial No. PCT US2022 012928, Written Opinion mailed Jun. 14, 2022", 6 pgs.

* cited by examiner (GT POWER CYCLE)

($O_2$ POWER CYCLE)

H2 POWER PLANT WITH O2 INTEGRATION

PRIORITY APPLICATION

This application is a U.S. National Stage Filing under 35 U.S.C. 371 from International Application Serial No. PCT/US2022/012928, filed Jan. 19, 2022, which application is a continuation of and claims the benefit of priority to U.S. Provisional Patent Application Ser. No. 63/236,898, filed Aug. 25, 2021, the contents of both which are incorporated herein by reference in their entireties.

TECHNICAL FIELD

This document pertains generally, but not by way of limitation, to power cycles used in gas turbine combined cycle (GTCC) power plants. More specifically, but not by way of limitation, the present application relates to turbine cooling air (TCA) systems for gas turbine engines used in GTCC power plants.

BACKGROUND

Gas turbine power generation equipment can generate electrical power by operating a gas turbine engine to drive an electrical generator. A gas turbine engine can comprise a compressor, a combustor, and a turbine. The compressor can generate high temperature, high pressure air by compressing air drawn into an air inlet. The combustor can generate high temperature, high pressure combustion gas by supplying fuel to the compressed air and causing the mixture to be combusted. The turbine can be configured with a plurality of turbine vanes and turbine blades disposed alternately in a turbine passage within a casing. The turbine blades can be driven with the combustion gas supplied to the turbine passage, thereby driving a turbine shaft connected to the turbine blades to rotate. The turbine shaft can be used to drive the compressor and electrical generator. The combustion gas that has driven the turbine can be released to the atmosphere as exhaust gas or used in other applications, such as a heat recovery steam generator (HRSG).

Conventionally, the gas turbine engine is provided with a cooling air system that can extract air from the compressor after or during compression ("bleed air"), cool the bleed air with a heat exchanger, and supply the cooled bleed air to the gas turbine engine to cool various parts thereof, such as turbine blades and the combustor, for example.

Examples of turbine cooling air coolers (TCA coolers) are described in Pat. No. U.S. Pat. No. 5,794,448 to Fujioka et al., titled "Gas turbine fuel heating apparatus" and Pat. No. U.S. Pat. No. 10,352,249 to Yamazaki et al., titled "Gas turbine power generation equipment, and device and method for drying gas turbine cooling air system."

In a gas turbine combined-cycle (GTCC) power plant, the combustor for the gas turbine engine can operate with a variety of fuels. Gas turbine combustors are typically designed for burning natural gas or other liquid fuels for use with current large-scale GTCC power plants. Combustion of hydrogen fuel (H2) produces no carbon dioxide (CO2) emissions. In order to combust H2 in GTCC power plants, the combustion system is typically re-designed to accommodate the differences in properties between natural gas or liquid fuels and H2. A typical gas turbine (GT) can handle about 30% to about 50% (vol %) H2 in combination with natural gas. If using a 30/70 or 50/50 split of H2 and natural gas, the turbine inlet temperature (Tlt) for current combustor designs may be reduced (derated) to achieve a similar nitrogen oxide (NOx) emissions level that results from burning natural gas. For example, H2 burns at hotter temperatures and thereby forms more oxides of nitrogen in the emissions. Therefore, in order to maintain the same NOx emissions as natural gas, the GTCC performance will be impacted in terms of power output as well as thermal efficiency due to the derated turbine inlet temperature. Burning 100% H2 fuel is desirable in order to progress the reduction of CO2 emissions for environmental considerations.

OVERVIEW

The present inventor has recognized, among other things, that improvements in power cycles can include the operation of turbine cooling air coolers (TCA coolers) within a gas turbine combined cycle power plant. For example, typical TCA coolers in GTCC power plants utilize feedwater from a heat recovery steam generator (HRSG) to cool compressed air used to cool other portions of the gas turbine engine. For example, the efficiency of the power cycle is reduced by the compressor of the gas turbine engine having to provide compressed air not used to rotate the turbine.

The present inventor has also recognized, among other things, that problems to be solved in power cycles can include the inefficient integration of hydrogen fuel in the operation of a gas turbine combined cycle power plant. For example, electrolyzers can be used to produce hydrogen for the combustor. Electrolyzers can also produce oxygen gas, which may be diverted from the GTCC to be vented to the atmosphere or for other applications, such as industrial uses.

The present subject matter can help provide solutions to these problems and other problems, such as by using electrolyzers to produce H2 for the combustor and O2 for use within the gas turbine via a TCA cooler. The electrolyzer can produce hydrogen gas and oxygen gas at high pressures such that pressurization by the compressor or another source is not needed. Heat can be transferred from compressed air, which may then be used to cool portions of the gas turbine engine, to high pressure oxygen which may be provided at the compressor outlet to the combustor. Furthermore, the high pressure oxygen gas represents a replacement of the bleed air used to cool portions of the gas turbine engine, thereby increasing the overall efficiency of the system because loading of the compressor is saved as the oxygen gas is already pressurized.

In an example, a power production facility can comprise a combined cycle power plant comprising a gas turbine engine configured to compress air for combustion with a fuel in a combustor to produce exhaust gas that can be used to produce rotational shaft power for generating electricity and a steam system configured to produce steam from water with the exhaust gas to rotate a steam turbine for generating additional electricity, an electrolyzer configured to generate H2 and O2, wherein the electrolyzer is configured to provide the H2 to the combustor for combustion and the O2 to portions of the gas turbine engine, and a heat exchanger configured to receive the O2 and fluid from the steam system and to heat the O2 before passing the O2 into portions of the gas turbine engine.

In another example, a method of generating power with a combined cycle power plant can comprise operating a gas turbine engine to combust a fuel to produce exhaust gas, rotating a turbine with the exhaust gas to rotate a shaft, generating electricity with a generator driven by the shaft, transferring heat from the exhaust gas to produce heated fluid in a heat recovery steam generator to rotate a steam turbine, generating electricity with a generator driven by the steam turbine, generating hydrogen gas and oxygen gas with an electrolyzer from a water input and an electrical input, routing the hydrogen gas to the gas turbine engine for combustion, routing the oxygen gas and the heated fluid through a heat exchanger, heating the oxygen gas in the heat exchanger, and routing the heated oxygen gas to the gas turbine engine for blending with combustion air.

In an additional example, a turbine cooling air system can comprise a combined turbine cooling air cooler comprising a first flow path for receiving bleed air from a compressor of a gas turbine engine, a second flow path in thermal communication with the first flow path, the second flow path configured for receiving oxygen gas from an oxygen source to cool the bleed air, and a third flow path in thermal communication with the first flow path, the third flow path configured for receiving feedwater from a heat recovery steam generator to cool the bleed air, a bypass line configured to route oxygen gas from the oxygen source directly to the gas turbine engine, and a first bleed air output of the combined turbine cooling air cooler configured to route at least a portion of the bleed air to a turbine of the gas turbine engine.

This overview is intended to provide an overview of subject matter of the present patent application. It is not intended to provide an exclusive or exhaustive explanation of the invention. The detailed description is included to provide further information about the present patent application.

Figure 1:
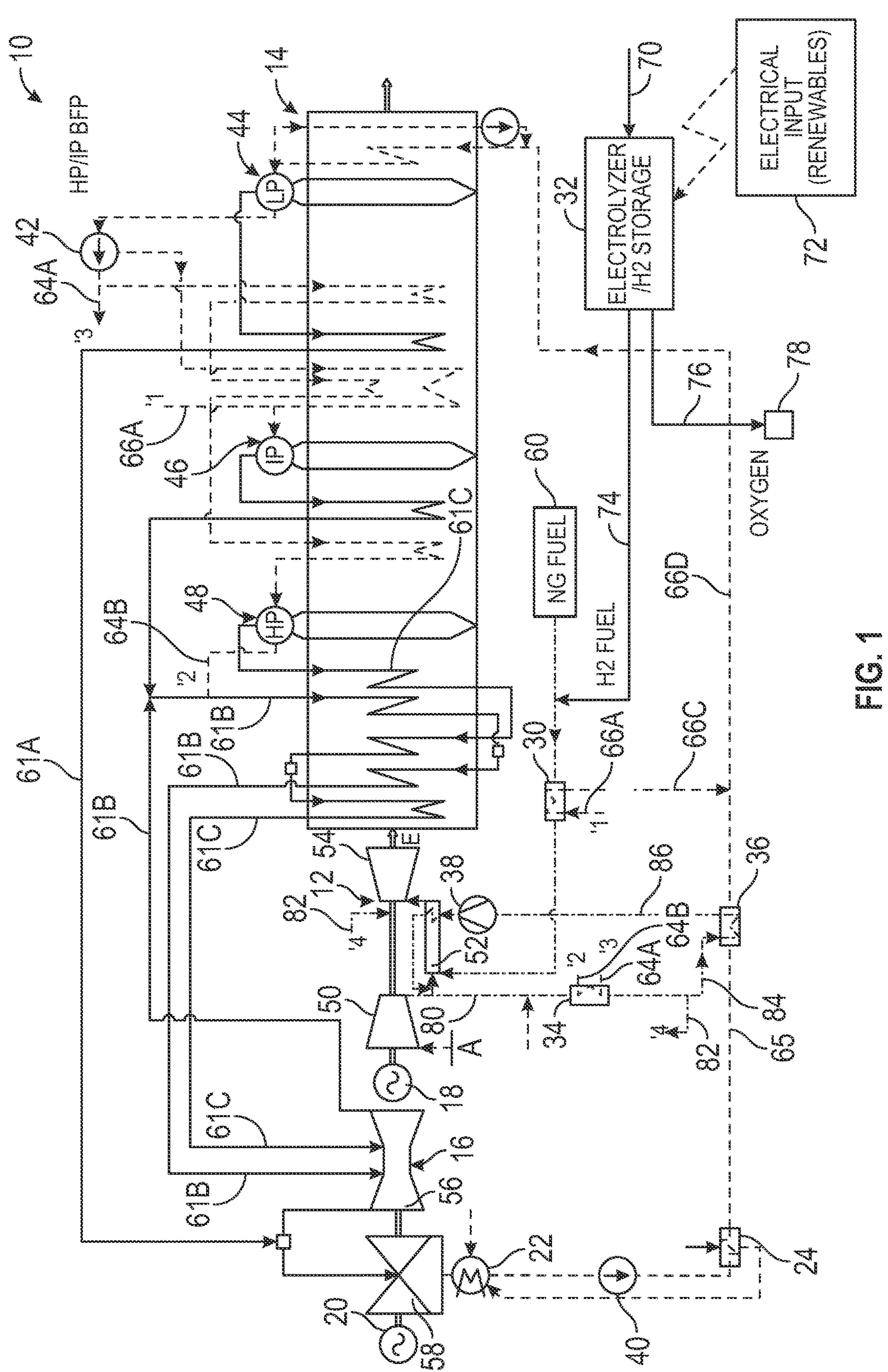
FIG. 1 is a schematic diagram illustrating a conventional Gas Turbine Combined Cycle (GTCC) power plant using an electrolyzer to provide hydrogen to a combustor.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram illustrating conventional Gas Turbine Combined Cycle (GTCC) power plant 10 having gas turbine engine (GTE) 12, Heat Recovery Steam Generator (HRSG) 14 and steam turbine 16. GTE 12 can be used in conjunction with electrical generator 18, and steam turbine 16 can be used in conjunction with electrical generator 20. Power plant 10 can also include condenser 22 and gland steam condenser (GSC) 24, fuel gas heater (FGH) 30, electrolyzer 32, Turbine Cooling Air (TCA) cooler 34 and Enhanced Cooling Air (ECA) cooler 36, enhanced cooling air compressor 38, condensate pump 40 and feedwater pump 42. HRSG 14 can include low pressure section 44, intermediate pressure section 46 and high pressure section 48. Condenser 22 can form part of a cooling system and can comprise a surface condenser with cooling water. GTE 12 can include compressor 50, combustor 52 and turbine 54. Steam turbine 16 can include IP/HP spool 56 and LP spool 58.

As will be discussed in greater detail below with reference to FIG. 1, TCA cooler 34 and ECA cooler 36 can utilize feedwater from HRSG 14 to cool compressed air extracted from compressor 50 ("bleed air") to cool portions of gas turbine engine 12, such as combustor 52 and turbine 54 as well as heat the high pressure O2 to be provided to the GTE 12. In examples, the bleed air can be provided to the inlet of combustor 52.

Ambient air can enter compressor 50 for compression. The compressed air can be fed to combustor 52 and mixed with fuel from fuel source 60 (after being heated in fuel gas heater 30), which can be a source of natural gas or liquid fuel. The compressed air from compressor 50 can be mixed with the fuel for combustion in combustor 52 to produce high energy gas for turning turbine 54. Rotation of turbine 54 can be used to produce rotational shaft power to drive compressor 50 and electrical generator 18. Exhaust gas E can be directed to HRSG 14, where exhaust gas E can interact with appropriate water/steam piping in high pressure section 48, intermediate pressure section 46 and low pressure section 44 to produce steam. The steam can be routed to IP/HP spool 56 and LP spool 58 of steam turbine 16 via steam lines 61C, 61B and 61A to produce rotational shaft power to operate electrical generator 20. Exhaust gas E can exit HRSG 14 utilizing any appropriate venting means, such as a stack. HRSG 14 can additionally include appropriate means for conditioning exhaust gas E to remove potentially environmentally hazardous materials. For example, HRSG 14 can include a Selective Catalytic Reduction (SCR) emissions reduction unit.

HRSG 14 working fluid, such as steam or water, can be used as a cooling source in TCA cooler 34 and ECA cooler 36 to cool the bleed air. Water from feedwater pump 42 can be supplied to TCA cooler 34 via line 64A, as is shown by arrows 3'-3', which can then be returned to high pressure section 48 via line 64B, as is shown by arrows 2'-2'. Water from GSC 24, via line 65, can be provided to ECA cooler 36 to further cool the bleed air. Water from HRSG 14 can also be used to perform fuel heating at fuel gas heater 30 with water line 66A, as is shown by arrows 1'-1', and water can then be returned to low pressure section 44 via lines 66C and 66D. Water flowing within HRSG 14 can generally be referred to as feedwater.

Electrolyzer 32 can be fed water, such as make up water, at inlet 70 and can be provided with electrical input from energy source 72, which may comprise one or more renewable energy sources. Make up water can comprise water provided to power plant 10 from an outside source, such as facility or municipal water, to replace lost or consumed water. Electrolyzer 32 can output hydrogen gas (e.g., H2) at line 74 and oxygen gas (e.g., (O2) at line 76. The hydrogen gas can be passed through FGH 30 before entering combustor 52. In the typical system of FIG. 1, the oxygen gas may be vented to the atmosphere or provided to an external application, such as storage 78 or an industrial application. However, with the present disclosure, the oxygen gas can be provided to the gas turbine engine 12, as shown in FIG. 2.

TCA cooler 34 and ECA cooler 36 can operate utilizing bleed air taken from compressor 50 at line 80. TCA cooler 34 can provide initial cooling using feedwater from high pressure section 48. The cooled bleed air can be fed to turbine 54 using line 82. The cooled bleed air can be used to cool vanes and blades of turbine 54, such as via impingement cooling or film cooling. At line 84, ECA cooler 36 can provide additional cooling using condensate in line 65. The further cooled bleed air can be fed to combustor 52 at line 86. This further cooled bleed air can be used to provide cooling to combustor 52, such as by providing combustor hardware cooling. Additionally, the bleed air can be consumed or partially consumed in the combustion process.

The heat energy transferred to the feedwater in TCA cooler 34 from the bleed air can result in some efficiency benefit by producing more steam in HRSG 14. However, the extraction of bleed air at line 80 can reduce the overall efficiency of gas turbine engine 12 because energy is degraded (from compressed air at topping cycle to feedwater at bottoming cycle). In the present disclosure, electrolyzer 32 can provide O2 to a modified or combination TCA cooler (CTCA cooler 90 of FIG. 2) to, indirectly via bleed air, cool gas turbine engine 12.

Figure 2:
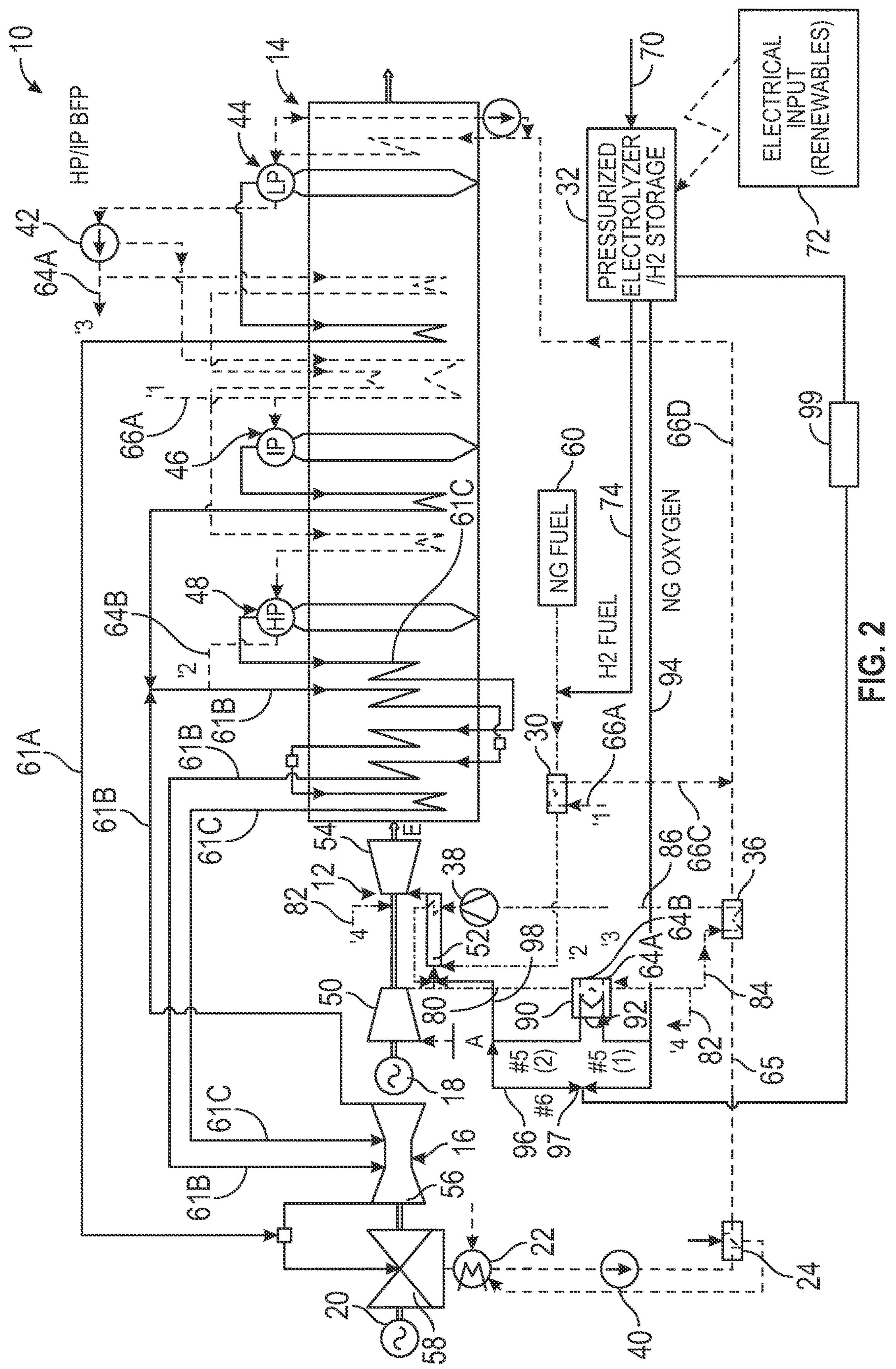
FIG. 2 is a schematic diagram illustrating a Gas Turbine Combined Cycle (GTCC) power plant of the present disclosure using an electrolyzer to provide hydrogen to a combustor and oxygen to a turbine cooling air cooler in an integrated O2 cycle.

FIG. 2 is a schematic diagram illustrating Gas Turbine Combined Cycle (GTCC) power plant 10 of FIG. 1 modified according to the present application to include an integrated O2 cycle comprising Combined TCA (CTCA) cooler 90. FIG. 2 utilizes the same reference numbers where appropriate to indicate the same or functionally equivalent components as FIG. 1 and omits reference numbers where modification has resulted in removal of such component. New reference numbers are added to indicate additional components.

CTCA cooler 90 can comprise heat exchanger 92 that can receive feedwater at line 64A and oxygen from electrolyzer 32 at line 94. Oxygen can also bypass CTCA cooler 90 via line 96. Oxygen from heat exchanger 92 and bypass line 96 can be fed to gas turbine engine 12 at line 98.

Heat exchanger 92 can comprise a dual action heat exchanger. That is, heat exchanger 92 can simultaneously exchange heat from bleed air to feedwater and oxygen. The bleed air does not fluidly mingle with the oxygen or feedwater. As such, CTCA cooler 90 can combine two cooling media for use with the bleed air. In examples, CTCA cooler 90 can comprise a type of multi-stream heat exchanger that is commonly used in the chemical industry.

Electrolyzer 32 can use electricity to split water (H2O) into hydrogen gas (H2) and oxygen gas (O2). Electrical input to electrolyzer 32 can be provided by energy source 72. In examples, energy source 72 can comprise one or more renewable energy sources, such as wind turbines, solar panels or hydro power. The renewable energy sources can be connected to hybrid combined cycle power plant 10 via a grid system or can be renewable energy sources connected directly to combined cycle power plant 10 or electrolyzer 32. Furthermore, storage containers (not shown) can be used to store excess quantities of H2 and O2, respectively. In additional examples, electrolyzer 32 can be replaced with or used in conjunction with other sources of pressurized H2 and O2 that can be fed to combustor 52 and CTCA cooler 90.

An examples of an electrolyzer 16 is described in Pat. No. U.S. Pat. No. 5,376,470 to Sprouse titled "Regenerative Fuel Cell System," which is incorporated herein by this reference. In examples, electrolyzer 32 can comprise a high-pressure (HP) electrolyzer that generates H2 and O2 at high pressure. By pressurizing the makeup water 70 used within electrolyzer 32, the hydrogen and oxygen produced can be provided at a higher pressure, and the need for external compressors can be eliminated. As the required compression power for liquid water is less than that for gaseous hydrogen or oxygen, overall energy consumption can be significantly saved by pressurizing the water.

Examples of such HP electrolyzers suitable to use as electrolyzer 32 may include a high-pressure hydrogen energy generator (HHEG) or Electrochemical-Thermally Activated Chemical (E-TAC) devices, which have recently been developed that are expected to reach 95% efficiency, operate at higher pressure (50 bar or higher) and cost significantly less than conventional electrolyzers. The HHEG or E-TAC can each be referred to as a HP Electrolyzer and can be used as electrolyzer 32.

Electrolyzer 32 can also produce pressurized oxygen (O2) which has built-in energy that is typically not taken advantage of in systems such as those shown in FIG. 1. However, as discussed herein, pressurized O2 generated by electrolyzer 32 can be used to relieve the burden on compressor 50 to improve the overall efficiency of GTCC power plant 10.

As described above, high pressure hydrogen (H2) generated in electrolyzer 32 can be blended with natural gas and further heated in fuel gas heater (FGH) 30 before sending to the GT combustor. High pressure oxygen (O2) from electrolyzer 32 can be heated in CTCA cooler 90 (from #5 (1) to #5 (2) at lines 94 and 98) and then the heated O2 can be introduced at the inlet of combustor 52 of GTE 12.

CTCA cooler 90 can be configured differently than TCA cooler of 34 of FIG. 1. TCA cooler 34 can utilize only HP feedwater from HRSG 14 as a cooling medium. Thus, TCA cooler 34 can comprise a two-way heat exchanger. CTCA cooler 90 of FIG. 2 can utilize HP feedwater from HRSG 14 as a cooling medium and HP O2 from electrolyzer 32 as a cooling medium. The HP feedwater and the HP O2 can be configured to flow in parallel through CTCA cooler 90, each in thermal communication with bleed air flowing between lines 80 and 84. Thus, CTCA cooler 90 can comprise a three-way heat exchanger.

As the flow of O2 increases along with increasing percentage of H2 content in the fuel, both H2 and O2 are generated by electrolyzer 32, heat absorbed by the O2 in CTCA cooler 90 will increase and the heat absorbed by the feedwater in CTCA cooler 90 will decrease proportionally. That is, as the flow of HP O2 from electrolyzer 32 increases, it will absorb more heat from the bleed air flowing through CTCA cooler 90, leaving less heat from the bleed air flowing through CTCA cooler 90 to be available to be absorbed by the HP feedwater. In examples, when the H2 in fuel ratio is greater than 84% by volume, the heat capacity of the O2 flow will be more than required for cooling the turbine cooling air (bleed air) and the balance (#6) of surplus O2 flow can bypass CTCA cooler 90, as shown in FIG. 2 at line 96. It can be beneficial for overall system performance to only cool the bleed air to a certain temperature. For example, the bleed air can be cooled to 215° C. Correspondingly, when the O2 flow associated with an H2 content of 84% is attained, the heat absorbed by feedwater will become zero. In the diagram, the flow indicated by reference #4 at line 82 represents turbine cooling air, e.g., bleed air that is provided to turbine 54 in condition for performing cooling.

Flow of O2 through line 96 can be controlled by valve 97, which can be operated by controller 99, which is responsive to and based upon the % volume of H2 in the fuel gas Additionally, flow of O2 through line 96 can be controlled by pressure and volume differentials. For example, when volumetric output of O2 from electrolyzer 32 becomes too large for CTCA cooler 90 overflow can be routed to line 96.

In gas turbine engine 12 of FIG. 1, the power consumed by compressor 50 can be close to 50% of power produced by turbine 54. HP O2 flow in line 94, as provided to the exit of compressor 50 via line 98 is at a pressure equivalent to the exit of compressor 50, and therefore does not need to be compressed by (or consume work from) compressor 50. Therefore use of the HP O2 flow represents a replacement of some of the energy removed via use of compressed air as bleed air, and much more useful work can be produced for the power cycle of gas turbine engine 12 based on this integrated HP O2 flow. Consequently, the overall efficiency of GTCC plant 10 can be improved.

As discussed above, an H2-fueled gas turbine can be derated (i.e. the Tlt can be reduced), such as for emissions control purposes. This derating can provide margin in the mechanical limits of gas turbine engine 12 to accept the additional power that can result from the flow of HP O2. Therefore, utilization of HP O2 from electrolyzer 32 can result in an increase of GTE 12 output relative to that shown in FIG. 1 (absent utilization of the HP O2).

In some embodiments, GTCC power plant 10 can use renewable electricity from energy source 72 that is available to power electrolyzer 32. When supply of O2 and H2 exceeds demand (such as when gas turbine engine 12 is not operating) the H2 and O2 generated by the electrolyzer 32 may be stored. For example, when gas turbine engine 12 is operated, it may be desired to also have electrolyzer 32 operating with GTCC power plant 10 to provide H2 and O2. Thus, gas turbine engine 12 and electrolyzer 32 can be operated together as a linked system. Electrolyzer 32, however, can be also operated independently of gas turbine engine 12, and can thus operate to fill storage containers (not shown) with O2 and H2 when gas turbine engine 12 is not operating.

Controller 99 can be used to coordinate operation of electrolyzer 32 with gas turbine engine 12 and CTCA 90. Controller 99 can operate electrolyzer 32 based on, for example, weather conditions and output of energy source 72. Controller 99 can manage operation of CTCA 90 by controlling how much O2 bypasses CTCA 90, such as by operating valve 97.

The present disclosure incorporates an O2 cycle that can efficiently utilize HP O2 in GTCC power plant 10 utilizing H2 as a fuel. The HP O2 can be first preheated in combined turbine cooling air (CTCA) cooler 90 and then introduced into combustor 52. The addition of high pressure and high temperature O2 to gas turbine engine 12 can lead to improvement in performance power plant 10 in terms of both efficiency and output, as discussed below.

The advantages of a combined cycle power plant with an integrated O2 cycle can be seen in a comparison to a conventional GTCC operating without the O2 cycle (FIG. 1) and a conventional GTCC operating with the O2 cycle (FIG. 2). The two systems can be modeled using software for four different cases, each having a different ratio of natural gas to H2 fuel. Case 1 can comprise the use of 30% H2 (in volume, for all 4 cases). Case 2 can comprise the use of 50% H2. Case 3 can comprise the use of 84% H2. Case 4 can comprise the use of 100% H2.

An example 1-on-1 GTCC, as shown in FIGS. 1 and 2, has a typical steam bottoming cycle featuring three pressure levels (HP, IP and LP) with reheat. As modeled, a duct burner is not included in the HRSG. The cooling system has a wet surface condenser with a mechanical draft cooling tower. The major assumed parameters of the steam bottoming cycle are listed in Table 1.

TABLE 1

Main Assumptions of Steam Bottoming Cycle of GTCC

| Parameter | Unit | Value |
|---|---|---|
| HP Steam Pressure at ST(steam turbine) Inlet | bar | 148 |
| IP Steam Pressure at ST Inlet | bar | 34 |
| LP Steam Pressure at ST Inlet | bar | 4.5 |
| HP Steam Temperature/ Hot Reheat Temperature at ST Inlet | ° C. | 585 |
| $\Delta T_{pp}$ of HRSG | ° C. | 8.3 |
| $\Delta T_{app}$ of HRSG | ° C. | 5.6 |
| Condenser Pressure | kPa | 5.6 |

The simulations for Cases 1-4 are based on ISO ambient conditions: 1.013 bar, dry bulb temperature of 15° C., and relative humidity of 60%.

Pressure of H2 and O2 as produced from electrolyzer 32 is assumed as 50 bar, as can be produced by high pressure electrolyzers described herein. This pressure level matches the requirement of combustor 52 and H2 will be blended with natural gas directly (without compression). The pressure of O2 is higher than that at the outlet of compressor 52, so it can be throttled before mixing with the combustion air. Temperature of H2/O2 from electrolyzer 32 is assumed as 25° C./95° C., respectively.

Four (4) base-load cases mentioned above were simulated, and the calculation results are illustrated in Table 2.

TABLE 2

Performance Data of Power Plant for Four Cases

| | | Cases | | | |
|---|---|---|---|---|---|
| | | 1 (30% $H_2$) | 2 (50% $H_2$) | 3 (84% $H_2$) | 4 (100% $H_2$) |
| GTCC Performance w/o Utilization of $O_2$ | | | | | |
| FGT | ° C. | 220 | 110 | 110 | 110 |
| GT Heat Input | GJ/h, LHV | 3,311 | 3,344 | 3,366 | 3,390 |
| GT Output | MW | 398 | 401 | 409 | 418 |
| ST Output | MW | 179 | 180 | 179 | 179 |
| Gross Power Train Output | MW | 577 | 581 | 589 | 597 |
| CC Efficiency | %, LHV | 62.7 | 62.5 | 63.0 | 63.4 |
| Performance Improvement by Utilization of $O_2$ | | | | | |
| $H_2$ flow | kg/s | 0.8 | 1.5 | 4.7 | 7.9 |
| $O_2$ flow | kg/s | 6.8 | 13.9 | 37.6 | 62.8 |
| Ratio, $O_2$/suction air | wt % | 0.9 | 1.9 | 5.2 | 8.8 |
| Overall CC Efficiency | %, LHV | 63.0 | 63.1 | 64.4 | 65.4 |
| Efficiency Increased | % points, LHV | 0.3 | 0.6 | 1.5 | 1.9 |
| Heat Rate Reduced | Btu/kWh, HHV | 26.6 | 54.2 | 140.7 | 189.8 |
| Output Increased | MW | 8.1 | 16.8 | 45.8 | 79.6 |

As presented in Table 2, output and efficiency of GTCC (base cases, w/o O2 utilization of FIG. 1) generally increase with increasing H2 content in fuel.

Figure 3A:
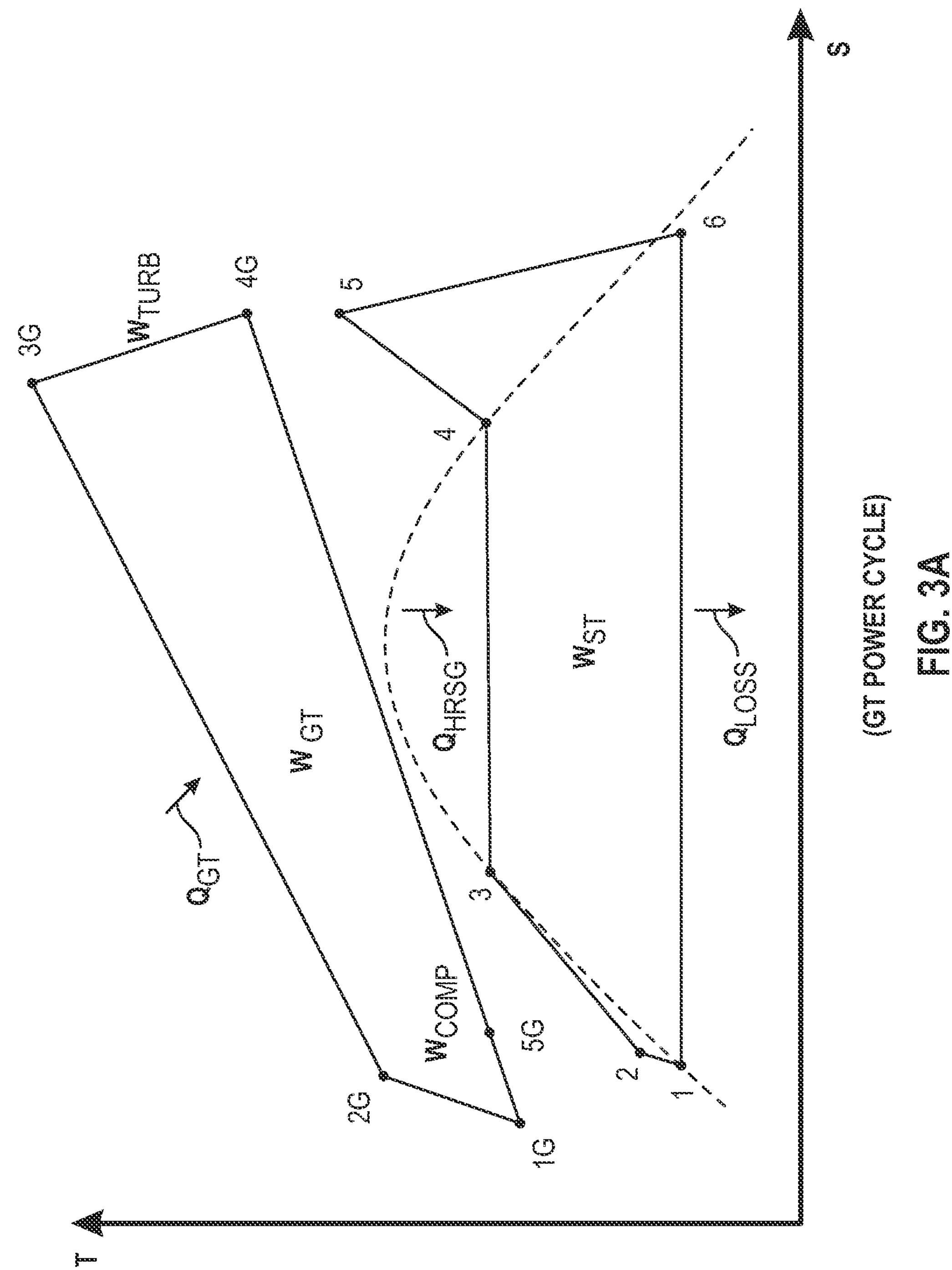
FIG. 3A is a graph showing a temperature-entropy (T-s) diagram of the GTCC system of FIG. 1.
Figure 3B:
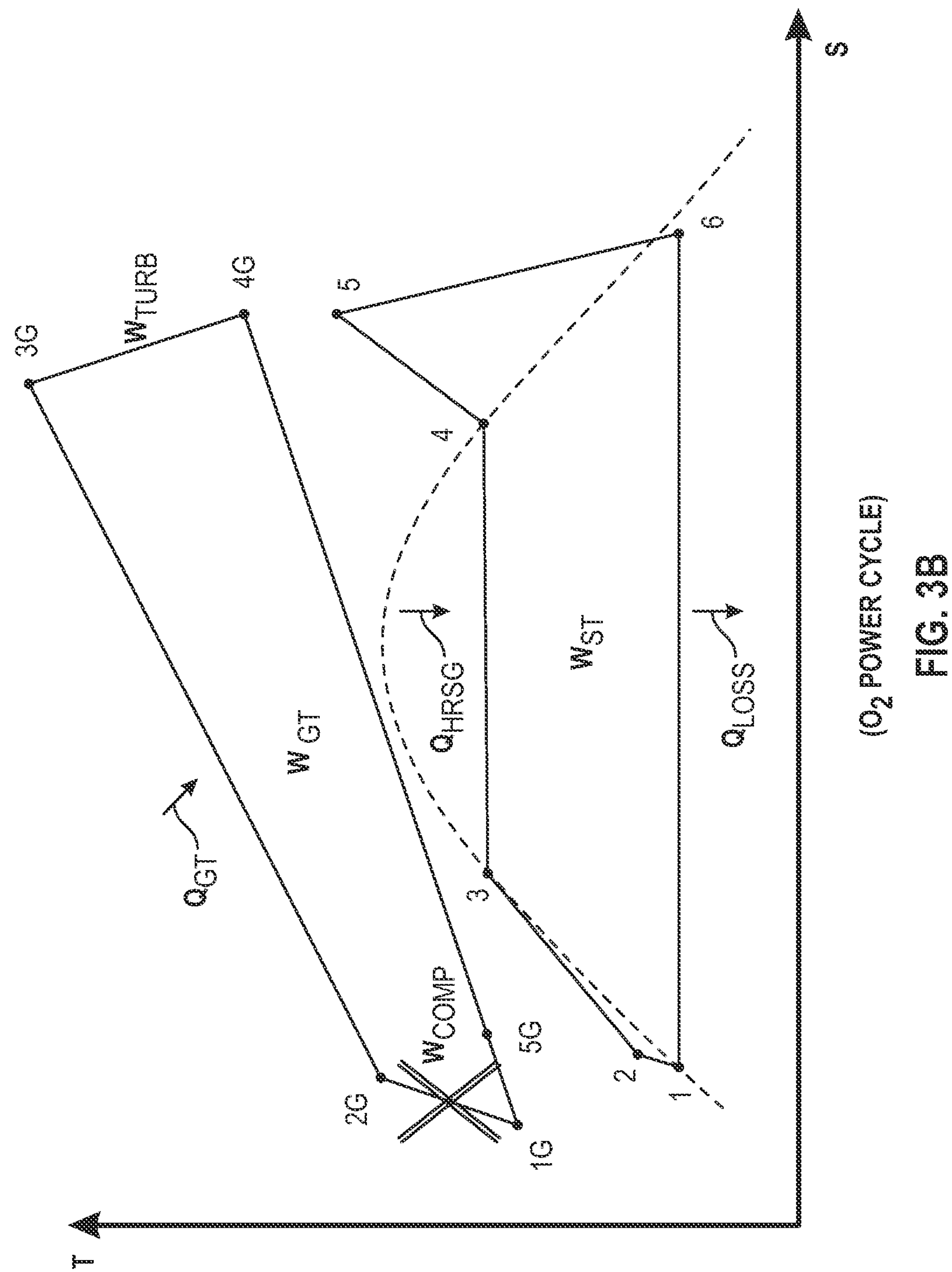
FIG. 3B is a graph showing a temperature-entropy (T-s) diagram of the combined GTCC and integrated O2 cycle of FIG. 2.

For calculation of performance improvement by utilization of the pressurized O2, a power cycle based on the flow of O2 was analyzed and compared with a typical GT power cycle as shown in FIGS. 3A and 3B. As previously discussed, compression of O2 is not needed (process from 1 g to 2 g removed as marked with an "X" in FIG. 3B).

To simplify the calculations, it was assumed: (1) O2 has the same thermal properties as air; (2) all processes (topping cycle as well as bottoming cycle) are same except for the process of compression (1 g to 2 g). It is understood that the assumptions can cause minor errors in calculations, but is be acceptable for demonstrating feasibility of the integrated O2 cycle.

There are two penalties for the O2 power cycle as illustrated in Table 3:

TABLE 3

Comparison of GT Power Cycle vs. O2 Power Cycle (30% H2)

| | GT Power Cycle | $O_2$ Power Cycle |
|---|---|---|
| $Q_{GT}$, base | 100.0 | 100.0 |
| $dQ_{GT}$, additional | — | 2.1 |
| $W_{comp}$ | 38.3 | — |
| $W_{turb}$ | 81.6 | 81.6 |
| $W_{GT}$ | 43.3 | 81.6 |
| $W_{ST}$ | 19.4 | 19.4 |
| $dW_{ST}$, loss* | — | 7.4 |
| $\eta_{CC}$, % | 62.7 | 91.7 |

In Table 3, $dQ_{GT}$, additional can be defined as: Extra heat to be generated in combustor by and due to a lower O2 temperature as compared to the temperature of air at the compressor outlet (resulting from the terminal temperature difference (TTD) of the "combined" TCA cooler, 25° C.), and dWST, loss can be defined as: Reduction in heat energy provided to HP feedwater that is now taken from the CTCA cooler 90 by the O2 flow.

The comparison with a typical GT power cycle (30% $H_2$) is presented in Table 3. Table 3 indicates that O2 power cycle is significantly more efficient than the standard GT power cycle (91.7% vs. 62.7%). This is because 38% of compression power is avoided in the O2 power cycle (e.g., 38% of compression output of compressor 50 is not consumed by providing bleed air), which is much higher than sum of the two penalties (shaded in Table 3).

It is understood that the comparison as presented in Table 3 is for Case 1 (30% H2) but the data for other cases is close to each other.

Overall combined cycle (CC) efficiency is the weighted average of efficiencies of GT power cycle and O2 power cycle based on the ratio of O2 to Inlet air A. The results of each case are presented in Table 2 which ranges from 63.0% to 65.4%. Consequently, the increase of CC efficiency is obtained as 0.3% to 1.9% points.

Additional power output by the O2 power cycle ("output increased" as in Table 2) is calculated accordingly, which ranges from 8.1 MW to 79.6 MW.

Figure 4:
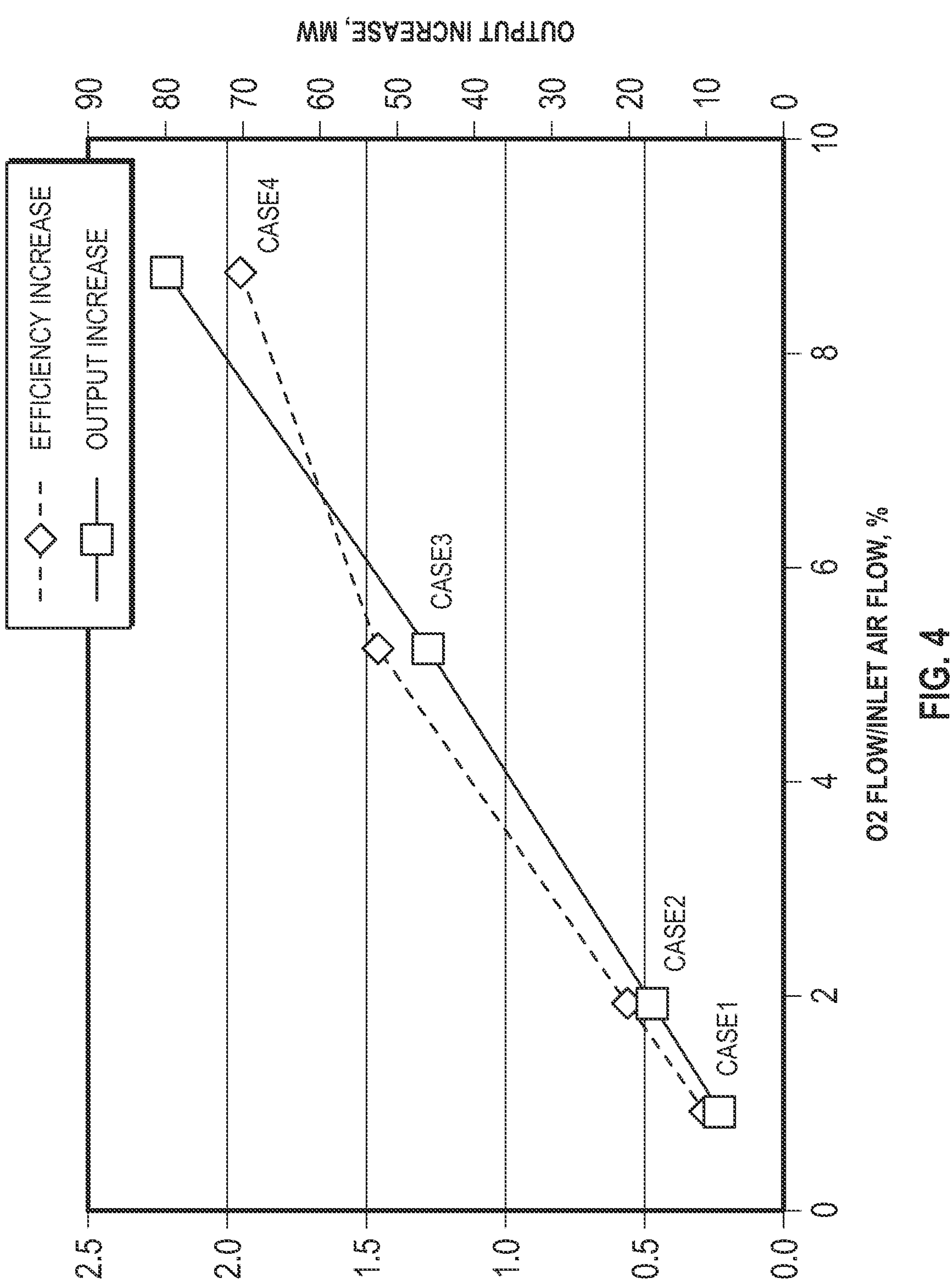
FIG. 4 is a schematic diagram illustrating efficiency and output of the Gas Turbine Combined Cycle (GTCC) power plant of FIG. 2 for differing ratios of H2 and Natural Gas as fuel.

FIG. 4 is a schematic diagram illustrating efficiency and output of Gas Turbine Combined Cycle (GTCC) power plant 10 of FIG. 2 for each of the different cases identified in Table 2 having differing ratios of H2 and Natural Gas as fuel. FIG. 4 graphically presents the performance improvement of integrating O2 from electrolyzer 32 into operation of GTCC power plant 10. The chart of FIG. 4 indicates that increase in efficiency and output become relatively less or more, respectively, when H2 content is changed from 84% to 100% (from Case 3 to Case 4). This is because Case 4 has only a portion of O2 flow (same as in Case 3) preheated in CTCA cooler 90 with the balance bypassed without preheating; the portion bypassed has lower temperature (95° C.) which impacts power cycle efficiency but leads to even more output increase due to $dW_{ST}$ avoided (see Table 3).

The performance improvement for Case 1 and Case 2 (as highlighted in double borders in Table 2) should be achievable without modification of gas turbine engine 12. However, the performance improvement for Case 3 and Case 4 (as highlighted in bold borders in Table 2) is discussed further below.

It is estimated that the additional cost for the new method, i.e., the incremental cost of CTCA cooler 90 as compared to a typical TCA cooler (2 vs. 1 cooling medium), could be less than 1.0 MM USD. Therefore, the payback period would be very short.

Figure 5:
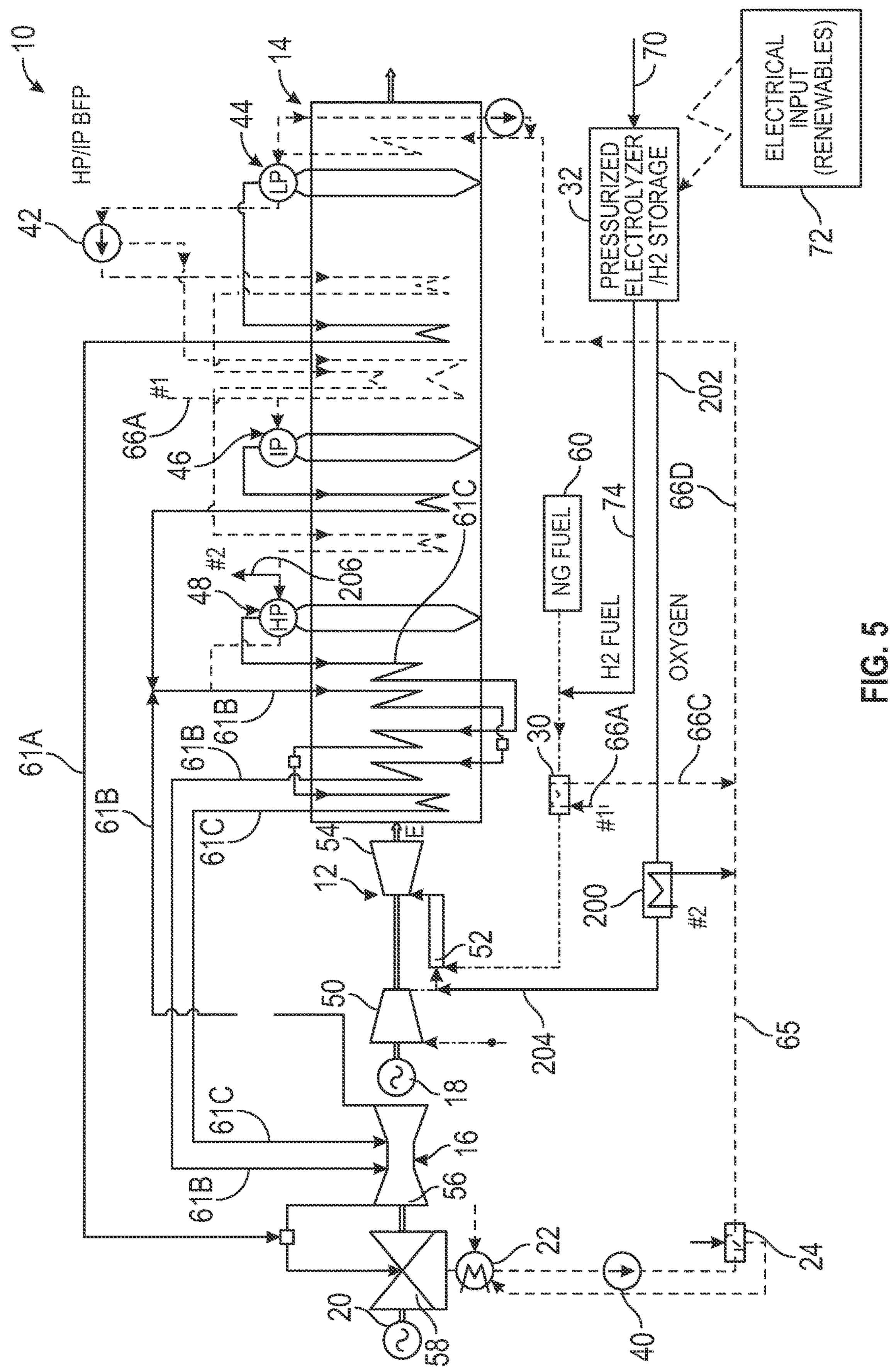
FIG. 5 is a schematic diagram illustrating a Gas Turbine Combined Cycle (GTCC) power plant of the present disclosure using HRSG feedwater to preheat O2 flow from an electrolyzer for use in cooling a gas turbine engine.

FIG. 5 is a schematic diagram illustrating Gas Turbine Combined Cycle (GTCC) power plant 10 of the present disclosure using HRSG feedwater to preheat O2 flow from electrolyzer 32 for use in cooling gas turbine engine 12. FIG. 5 utilizes the same reference numbers where appropriate to indicate the same or functionally equivalent components as FIGS. 1 and 2 and omits reference numbers where modification has resulted in removal of such component. New reference numbers are added to indicate additional components.

In FIG. 5, CTCA cooler 90 can be replaced with heat exchanger 200. Heat exchanger 200 can be configured to receive oxygen from electrolyzer 32 in line 202 and can directly provide oxygen to gas turbine engine 12 in line 204. In examples, the oxygen can be provided directly to combustor 52. Heat exchanger 200 can provide heat to oxygen in heat exchanger 200 by being provided with feedwater from HRSG 14 in line 206, which can extend between points #2 indicated in FIG. 5. The configuration of FIG. 5 provides a simplified O2 cycle where bleed air on compressor 50 can be eliminated.

Figure 6:
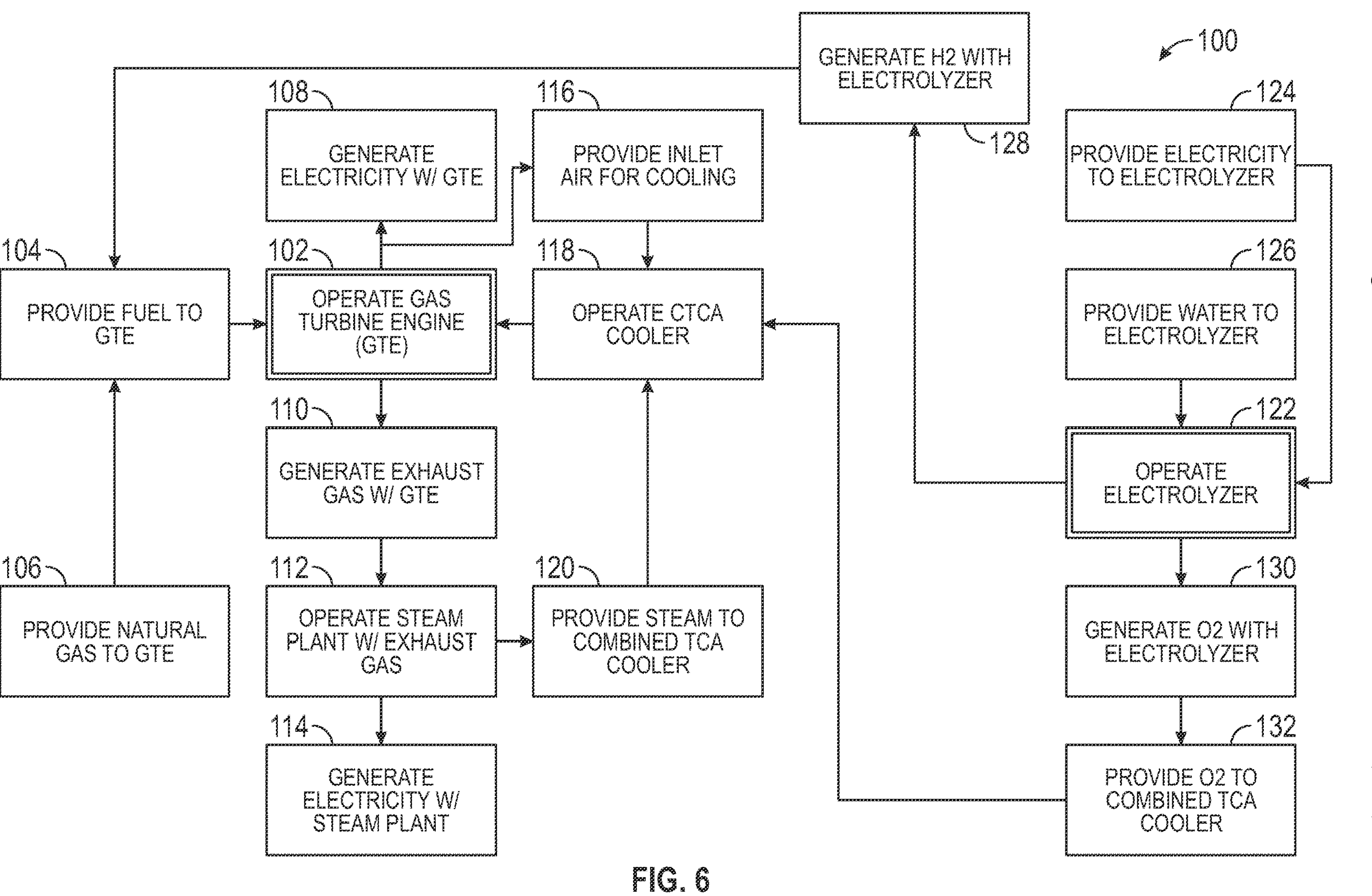
FIG. 6 is a line diagram illustrating steps of a method for operating the combined GTCC and integrated O2 cycle system of FIG. 2.

FIG. 6 is a line diagram illustrating steps of method 100 for operating combined cycle power plant 10 with electrolyzer 32 and CTCA cooler 90, as shown in FIG. 2. Reference numbers discussed with reference to FIG. 6 can be found in FIG. 2. Method 100 can additionally be representative of the operation of other combined cycle power plants configured similarly to or different than combined cycle power plant 10. Method 100 can comprise simultaneous operation of gas turbine engine 12, HRSG 14 and electrolyzer 32. In additional examples, gas turbine engine 12, HRSG 14 and electrolyzer 32 can be operated alternatively or sequentially in various orders as needed for start-up and shut down, maintenance or partial operation such as due to varying power demand conditions.

At step 102, gas turbine engine 12 can be operated. Inlet Air A and fuel F can be provided to combustor 52 to be burned and produce exhaust gas E. A single gas turbine engine is illustrated in FIG. 2, but more than one of gas turbine engine 12 can be used.

At step 104, fuel F can be provided to gas turbine engine 12. In examples, the fuel can comprise 100% natural gas. In examples, the fuel can comprise about 50% to about 70% natural gas, with the balance comprising hydrogen (H2) provided by electrolyzer 32 at step 128. In other examples, the fuel can comprise about 50% to 100% H2. At step 104, controller 99 can coordinate inflow of natural gas from step 106 and H2 from step 128 to combustor 52.

At step 106, the fuel F provided to gas turbine engine 12 can comprise natural gas from fuel source 60, which can comprise a storage system or a pipeline.

At step 108, operation of gas turbine engine 12 can be used to generate rotational shaft power that can be used to drive an electrical generator to generate electricity for providing to a power grid. For example, electrical generator 18 can be operated to provide electrical power to a grid system.

At step 110, exhaust gas E can be generated with gas turbine engine 12 from the combustion of the fuel F and compressed air in compressor 50.

At step 112, steam turbine 16 can be operated, such as via steam produced in HRSG 14. Exhaust gas E from gas turbine engine 12 can be used to convert water to steam in HRSG 14. Steam from HRSG 14 can be used to drive steam turbine 16.

At step 114, operation of steam turbine 16 can be used to generate rotational shaft power that can be used to drive an electrical generator to generate electricity for providing to a power grid. Steam turbine 16 can provide electrical power to the grid system that is provided power by electrical generator 20.

At step 116, bleed air from compressor 50 can be extracted for cooling other parts of gas turbine engine 12. The bleed air can comprise air compressed by compressor 50. Parts of gas turbine engine 12 cooled by the bleed air can comprise turbine blades, turbine vanes and combustor 52. The bleed air can be at elevated temperature, but can be relatively colder than temperatures reached within turbine 54. However, in order to provide better cooling of turbine 54, the bleed air can be cooled before routing into turbine 54. Further, the pressurization of the bleed air provided by compressor 50 can facilitate flow of the bleed air to turbine 54, which, as discussed herein, can come at a penalty to the operating efficiency of gas turbine engine 12.

At step 118, the bleed air can be provided to combined turbine cooling air cooler (CTCA cooler) 90. CTCA cooler 90 can utilize steam and/or feedwater from HRSG 14 and/or O2 from electrolyzer 32 to cool the bleed air extracted from compressor 50 at step 116. Furthermore, CTCA cooler 90 can heat and forward HP O2 from electrolyzer 32 to gas turbine engine 12 for combustion.

At step 120, water from HRSG 14 can be provided to CTCA cooler 90. The water can extract heat from the bleed air to change the temperature of the bleed air to levels appropriate for turbine cooling.

At step 122, electrolyzer 32 can be operated. As discussed, electrolyzer 32 can comprise a high pressure (HP) electrolyzer to achieve electrolysis of water to produce hydrogen and oxygen at high pressures. Example HP electrolyzers may use a solid oxide, or ceramic electrolyte. A single electrolyzer is illustrated in FIG. 2, but more than one of electrolyzer 32 can be used. Electricity provided to electrolyzer 32 at step 124 and water provided to electrolyzer 32 at step 126 can be converted to O2 gas and H2 gas. In examples, the O2 gas and H2 gas can be at elevated pressures, such as at 50 bar or above. In additional examples, O2 gas and H2 gas can be provided by other means than an electrolysis unit, such as from pressurized storage tanks.

At step 124, electricity can be provided to electrolyzer 32, such as by power source 78. In examples, power source 78 can comprise one or more renewable energy sources such as wind, solar and hydro. Electricity can additionally be provide by a connection to a power grid.

At step 126, water can be provided to electrolyzer 32, such as from an external source including a makeup water source for HRSG 14.

At step 128, hydrogen gas (H2) generated by electrolyzer 32 can be provided to gas turbine engine 12 for fuel. Controller 99 can coordinate flow of H2 to combustor 52.

At step 130, electrolyzer 32 can generate a flow of oxygen gas (O2) at high pressure.

At step 132, O2 generated by electrolyzer 32 can be provided to CTAC 90 for cooling bleed air and then directed to gas turbine engine 12 for blending with combustion air.

The systems and methods of the present disclosure can achieve numerous benefits by combining H2 and O2 from one or more of electrolyzer 32, such as high pressure electrolyzers described herein, with GTCC power plant 10, as described in the following examples.

The assessment findings indicate that a significant performance improvement can be achieved by application of the new method of utilization of O2 in a H2-fueled GTCC power plant at various ranges of % vol of H2 fuel. The increase of combined cycle (CC) efficiency is approximately 0.3%-1.9% points, with an increase in output of approximately 8.1-79.6 MW.

Economic analysis shows that the new method can add significant value to an H2-fueled GTCC project. The payback period would be very short.

A derated Tlt of for burning $H_2$ fuel may result in a reduction in GTE output of around 20 MW in a typical case. Case 1 and Case 2 increase plant output by 8.1 and 17 MW, respectively, which should be within the capability of the gas turbine engine.

Case 3 and Case 4 could have over 45 MW output increase, which may exceed the capability of the gas turbine engine. As a result, modification/upgrading in hardware may be desirable. However, upgrading the gas turbine engine could be justified given the significant improvement in performance and attractive economic benefit.

This concept is also applicable to gas turbines without a TCA cooler as shown in FIG. 5 where a feedwater-type heater is designed for preheating the $O_2$ flow.

VARIOUS NOTES & EXAMPLES

Example 1 is a power production facility comprising: a combined cycle power plant comprising: a gas turbine engine configured to compress air for combustion with a fuel in a combustor to produce exhaust gas that can be used to produce rotational shaft power for generating electricity; and a steam system configured to produce steam from water with the exhaust gas to rotate a steam turbine for generating additional electricity; an electrolyzer configured to generate H2 and O2, wherein the electrolyzer is configured to provide the H2 to the combustor for combustion and the O2 to portions of the gas turbine engine; and a heat exchanger configured to receive the O2 and fluid from the steam system and to heat the O2 before passing the O2 into portions of the gas turbine engine.

In Example 2, the subject matter of Example 1 optionally includes into portions of the gas turbine engine.

In Example 3, the subject matter of any one or more of Examples 1-2 optionally include to bleed air entering the combustor.

In Example 4, the subject matter of any one or more of Examples 1-3 optionally include are configured to cool the bleed air within the three-way heat exchanger.

In Example 5, the subject matter of Example 4 optionally includes flow in parallel in the three-way heat exchanger.

In Example 6, the subject matter of Example 5 optionally includes a bypass to allow O2 to bypass the heat exchanger to flow directly to the gas turbine engine; and a bypass valve to control flow through the bypass.

In Example 7, the subject matter of Example 6 optionally includes a controller configured to operate the electrolyzer and the bypass valve.

In Example 8, the subject matter of Example 7 optionally includes the fuel being natural gas, and the H2 and the fuel are provided to the combustor in a ratio in a range of about approximately 30/70 to 100/0.

In Example 9, the subject matter of Example 8 optionally includes the controller being configured to open the bypass valve when the ratio of H2 to natural gas in fuel is approximately 84/16.

In Example 10, the subject matter of any one or more of Examples 1-9 optionally include the electrolyzer being configured to generate H2 and O2 at pressures at or above 50 bar.

In Example 11, the subject matter of any one or more of Examples 1-10 optionally include wherein the portions of the gas turbine engine comprise the combustor.

Example 12 is a method of generating power with a combined cycle power plant, the method comprising: operating a gas turbine engine to combust a fuel to produce exhaust gas; rotating a turbine with the exhaust gas to rotate a shaft; generating electricity with a generator driven by the shaft; transferring heat from the exhaust gas to produce heated fluid in a heat recovery steam generator to rotate a steam turbine; generating electricity with a generator driven by the steam turbine; generating hydrogen gas and oxygen gas with an electrolyzer from a water input and an electrical input; routing the hydrogen gas to the gas turbine engine for combustion; routing the oxygen gas and the heated fluid through a heat exchanger; heating the oxygen gas in the heat exchanger; and routing the heated oxygen gas to the gas turbine engine for blending with combustion air.

In Example 13, the subject matter of Example 12 optionally includes routing bleed air from a compressor of the gas turbine through the heat exchanger; cooling the bleed air with at least one of the oxygen gas and the heated fluid from the heat recovery steam generator in the heat exchanger; and cooling a portion of the gas turbine engine with the bleed air.

In Example 14, the subject matter of Example 13 optionally includes passing the heated fluid and the oxygen gas through the heat exchanger in parallel.

In Example 15, the subject matter of any one or more of Examples 12-14 optionally include bypassing the heat exchanger with at least a portion of the oxygen gas.

In Example 16, the subject matter of Example 15 optionally includes % or greater In Example 17, the subject matter of Example 16 optionally includes % or greater, wherein the heated fluid comprises high pressure feedwater.

Example 18 is a turbine cooling air system comprising: a combined turbine cooling air cooler comprising: a first flow path for receiving bleed air from a compressor of a gas turbine engine; a second flow path in thermal communication with the first flow path, the second flow path configured for receiving oxygen gas from an oxygen source to cool the bleed air; and a third flow path in thermal communication with the first flow path, the third flow path configured for receiving feedwater from a heat recovery steam generator to cool the bleed air; a bypass line configured to route oxygen gas from the oxygen source directly to the gas turbine engine; and a first bleed air output of the combined turbine cooling air cooler configured to route at least a portion of the bleed air to a turbine of the gas turbine engine.

In Example 19, the subject matter of Example 18 optionally includes an enhanced cooling air cooler configured to receive: a second bleed air output of the combined turbine cooling air cooler; and condensate from the heat recovery steam generator to cool the second bleed air output; and an output line configured to provide the cooled second bleed air output to a combustor of the gas turbine engine.

In Example 20, the subject matter of any one or more of Examples 17-19 optionally include a valve in the bypass line to selectively control flow of oxygen gas therethrough.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A power production facility comprising:

a combined cycle power plant comprising:

a gas turbine engine configured to use a compressor to compress air for combustion with a fuel in a combustor to produce exhaust gas that can be used to produce rotational shaft power for generating electricity, the gas turbine engine further configured to produce a flow of bleed air extracted from the compressor; and a steam system configured to produce steam from feedwater with the exhaust gas to rotate a steam turbine for generating additional electricity;

an electrolyzer configured to generate a flow of H2 and a flow of O2 separate from each other; and a heat exchanger configured to receive the flow of O2, the bleed air and a fluid stream from the steam system and to heat the flow of O2 with heat from the bleed air and the fluid stream;

wherein the flow of O2 flows from the electrolyzer, through the heat exchanger to be heated, and to the combustor via an oxygen line;

wherein the fluid stream flows from the steam system, through the heat exchanger to be heated, and to the steam system;

wherein the flow of bleed air flows from the compressor, through the heat exchanger to be cooled, and to other portions of the gas turbine engine to perform cooling; and wherein the flow of H2 flows from the electrolyzer to the combustor without flowing through the heat exchanger via a hydrogen line.

2. The power production facility of claim 1, wherein the heat exchanger comprises a three-way, dual-action heat exchanger configured to receive the flow of O2, the fluid stream and the bleed air from the gas turbine engine, the three-way, dual-action heat exchanger configured to cool the flow of bleed air from two separate sources.

3. The power production facility of claim 2, wherein the fluid stream and the flow of O2 flow in parallel in the three-way, dual-action heat exchanger.

4. The power production facility of claim 3, further comprising:

a bypass to allow at least some of the flow of O2 to bypass the heat exchanger to flow directly to the gas turbine engine; and a bypass valve to control flow through the bypass.

5. The power production facility of claim 4, further comprising a controller configured to operate the electrolyzer and the bypass valve.

6. The power production facility of claim 5, wherein:

the fuel is natural gas; and the flow of H2 and the natural gas are provided to the combustor in a ratio in a range of 30/70 to 100/0.

7. The power production facility of claim 6, wherein the controller is configured to open the bypass valve when the ratio by volume of H2 to natural gas is 84/16.

8. The power production facility of claim 1 wherein the electrolyzer is configured to generate the flow of H2 and the flow of O2 at pressures at or above 50 bar such that the flow of H2 and the flow of O2 to the combustor can match pressures of combustion within the combustor.

9. The power production facility of claim 1, wherein the other portions of the gas turbine engine comprise a turbine section of the gas turbine engine.

10. A method of generating power with a combined cycle power plant, the method comprising:

operating a gas turbine engine to combust a fuel with compressed air to produce exhaust gas;

operating a compressor of the gas turbine engine to produce a flow of bleed air;

rotating a turbine with the exhaust gas to rotate a shaft;

generating electricity with a generator driven by the shaft;

transferring heat from the exhaust gas to produce heated feedwater in a heat recovery steam generator to rotate a steam turbine;

generating electricity with a generator driven by the steam turbine;

generating a flow of hydrogen gas and a flow of oxygen gas that is separate of the flow of hydrogen gas with an electrolyzer from a water input and an electrical input;

routing the flow of hydrogen gas to the gas turbine engine for combustion;

routing the flow of oxygen gas through a heat exchanger;

routing a flow of fluid from the heat recovery steam generator through the heat exchanger;

routing the flow of bleed air through the heat exchanger;

cooling the flow of bleed air in the heat exchanger with the flow of fluid and the flow of oxygen gas;

routing the flow of bleed air from the heat exchanger to portions of the gas turbine engine to perform cooling;

routing the flow of fluid from the heat exchanger back to the heat recovery steam generator; and routing the heated flow of oxygen gas to the gas turbine engine for blending with combustion air separate from the flow of hydrogen gas;

wherein the flow of hydrogen gas flows from the electrolyzer to a combustor of the gas turbine engine without flowing through the heat exchanger.

11. The method of claim 10, further comprising:

cooling the bleed air with at least one of the oxygen gas and the flow of fluid from the heat recovery steam generator in the heat exchanger.

12. The method of claim 11, further comprising passing the flow of fluid and the oxygen gas through the heat exchanger in parallel.

13. The method of claim 10, further comprising bypassing the heat exchanger with at least a portion of the oxygen gas.

14. The method of claim 13, wherein bypassing the heat exchanger with at least a portion of the oxygen gas begins when a ratio of hydrogen gas to natural gas in fuel is approximately 80% or greater.

15. The method of claim 14, further comprising absorbing no heat with the heated feedwater when the ratio is approximately 80% or greater, wherein the heated feedwater comprises high pressure feedwater.

16. The power production facility of claim 1, wherein the other portions of the gas turbine engine comprise the combustor.

17. The power production facility of claim 1, wherein the flow of O2 is introduced into one or both of compressed air before entering the combustor and an air intake inlet of the combustor.

18. The power production facility of claim 1, wherein the flow of H2 is introduced into a flow of the fuel before entering the combustor.

19. The power production facility of claim 5, wherein the controller is configured to control flow of O2 through the bypass valve based on pressure and volume differentials of O2 flow from the electrolyzer.

20. The power production facility of claim 5, wherein the bypass valve is configured to allow O2 flow to bypass the heat exchanger when volumetric output of O2 from the electrolyzer exceeds cooling requirements for bleed air.

* * * * *